(12) United States Patent
Caridis et al.

(10) Patent No.: US 6,558,724 B1
(45) Date of Patent: May 6, 2003

(54) COOKING BY ENROBING THROUGH CONTROLLED CURTAIN SPILLAGE

(75) Inventors: Andrew A. Caridis, San Carlos, CA (US); Leonardo P. Murgel, San Francisco, CA (US); Carl Beitsayadeh, San Francisco, CA (US); John Silvester, Hayward, CA (US)

(73) Assignee: Heat and Control, Inc., Hayward, CA (US)

(*) Notice: Subject to any disclaimer, the term of this patent is extended or adjusted under 35 U.S.C. 154(b) by 0 days.

(21) Appl. No.: 09/494,971

(22) Filed: Jan. 31, 2000

Related U.S. Application Data

(62) Division of application No. 09/222,547, filed on Dec. 29, 1998, now Pat. No. 6,061,899.

(51) Int. Cl.[7] .................................................. A23L 1/01
(52) U.S. Cl. ...................................................... 426/438
(58) Field of Search ................................ 426/523, 438; 99/404, 330, 407, 408, 331, 332, 333, 334, 403, 405, 406, 409–418, 443 C, 386

(56) References Cited

U.S. PATENT DOCUMENTS

| | | | | |
|---|---|---|---|---|
| 4,386,559 A | * | 6/1983 | El-Hag et al. | ................. 99/404 |
| 4,882,984 A | * | 11/1989 | Eves | ............................ 99/404 |
| 5,066,505 A | | 11/1991 | Vos | |
| 5,570,626 A | | 11/1996 | Vos | |
| 6,067,899 A | * | 5/2000 | Caridis et al. | ................. 99/404 |

* cited by examiner

Primary Examiner—Arthur L. Corbin
(74) Attorney, Agent, or Firm—Donald N. MacIntosh

(57) ABSTRACT

A process for cooking food products, such as battered and breaded pieces of meat, with hot oil by placing the products on a conveyor and passing them through a plurality of descending hot oil curtains to enrobe and cook the products. The cooking oil is supplied from above through oil inlet weirs in a smooth curtain with the flow volume and temperature being controlled. The cooking oil is returned for reheating and the products are removed from the conveyor in a cooked condition.

18 Claims, 9 Drawing Sheets

COOKING BY ENROBING THROUGH CONTROLLED CURTAIN SPILLAGE

This application is a division of Ser. No. 09/222,547, filed Dec. 29, 1998, now U.S. Pat. No. 6,061,899.

FIELD OF THE INVENTION

Typical products 19 which are treated in the fryer 10 include, for example, onion rings as well as other vegetables; meats such as chicken and beef as well as fish. These food products as choice can be first dipped in a viscous batter and then covered with a layer of bread crumbs or similar coating which adheres to the batter, thus increasing the weight of the product. Unless handled carefully in the cooking operation, a portion of the breading or other coating will not adhere to the product and will fall into the cooking oil which is undersirable as discussed above. Desribed below are steps which materially reduce the amount of brad and batter material stripped from the product through the cooking operation when such products are so breaded.

BACKGROUND OF THE INVENTION

A number of successfully marketed food products, chicken, beef, fish, filled dough, vegetables, etc. sometimes are prepared by coating or battering the product and covering the coating with bread crumbs or the like and frying thereafter. During the frying step in which the product is either partially or fully cooked, it is highly desirable that as much of the breading or other coating be retained on the product and that a very minimum of the coating slough off into the cooking oil. When particles of the coating break away from the product, this results in a lower production yield and the fines sloughed off contaminate the frying oil. These breading and product fines must be removed from the frying medium on a regular basis to avoid degrading the cooking oil to a point where it must be supplemented by a higher quality oil or else removed for recycling. This event places a high economic burden on control of the cooking oil as well as control on the battered and breaded product. Maintaining a balance between product yield and oil quality has been a challenge which faced food processors over a long period of time. This is true as well of the non breaded and battered products that comprises the bulk of the market.

Prior art equipment and techniques were developed in attempts to minimize the removal of breading or other coatings from the underlying food product. In the conventional hot oil cooking fryer substantial turbulence or "boil" is generated when the relatively cold uncooked food product is dropped into the hot cooking oil. This turbulence contributed to removal of portions of coatings and continued to a lesser degree as the product is conveyed through and cooked in the hot oil bath. To overcome this undesirable effect food processors turned to cooking the products in batch cookers where the relative motion between the product and the cooking oil would be quite low, although the initial turbulence or "boil" was always present. Other procedures involved cooking in ovens after applying an oil spray coating as a preparatory step to the oven cooking. Gentle handling of the coated product while cooking was a desired goal but rarely achieved to complete satisfaction for high product yields with high production output.

It is highly desirable to minimize the relative motion between the bread and battered product and the cooking medium, whether the cooking medium is cooking oil or a process cooking vapor. This is evident because a rapidly moving cooking medium is more than likely the cause of portions of the bread coating to be removed from the product which thereby reduces the yield on the one hand and produces contamination of the cooking medium on the other.

Where the choice is made to cook a breaded and batter product in cooking oil there are substantial advantages in using the minimum practical amount or volume of cooking oil. However where the product fryer has a large bath of cooking oil, the large air-oil surface and the consequent exposure of the cooking oil to air causes the oil to degrade. Replacement of the complete oil bath or make-up oil must be supplied to maintain or uphold the desired cooking oil quality. Shoed the oil degrade significantly, there will be caused an "off taste" to be imparted to the product. This must be guarded against to avoid product rejection for quality control reasons as well as to postpone the costly replacement of the degraded oil. In the prior art use of a reduced volume of cooking oil has been thought to be impractical where high product output is the goal.

SUMMARY OF THE INVENTION AND OBJECTS

In summary, the invention is comprised of an improved fryer for treating a food product with hot cooking oil gently dispensed from above onto the food product. The food products are normally mechanically delicate. The fryer is comprised of a housing defining an enclosed cooking zone and having exhaust vents for withdrawing cooking vapors and odors therefrom. A main endless conveyor with variable speed drive is provided for transporting the food product through the cooking zone and includes a conveyor belt through which cooking oil may flow freely. A submerger conveyor may be provided arranged superimposed on the main conveyor, for submerging products which tend to float. A plurality of cooking oil inlet distribution stations are spaced longitudinally apart along said main conveyor and are arranged above the product carrying conveyor belt a distance sufficient to permit the product to pass thereunder. The cooking oil distribution stations extend substantially the full-width of the conveyor belt for treating the food products as they are carried through the fryer housing. Each cooking oil inlet distribution station includes a cooking oil reservoir of relatively small surface area exposed to the steam/air atmosphere and equipped with at least one overflow weir permitting the cooking oil to flow there over in an unbroken vertical curtain downwardly onto and over such food product carried upon the conveyor belt. A cooking oil feed conduit serves to supply each cooking oil distribution station, the feed conduit having multiple discharge openings disposed in the reservoir below the atmosphere-oil surface level so that as oil flows over as the weir in a curtain enrobing the product, the reservoir is resupplied with oil beneath the oil liquid level.

Another feature permits cooking a product while it is fully submerged in cooking oil in which application the distribution station provides for the gentle return to the fryer of the externally heated cooking oil while maintaining a substantially uniform oil temperature along the length of the fryer.

In another aspect the invention comprises an improved process for treating a food product such as one which typically carries a pre-cook coating that is fragile and easily dislodged if safeguards are not taken, comprising the steps of providing a fryer having an endless conveyor including a conveyor belt through which oil can flow freely, and providing a volume of cooking oil in the fryer, and maintaining the oil level such that the food products carried on the conveyor are not completely submerged in the cooking oil, placing such food products with the fragile coating on the conveyor at a loading station for treatment in the fryer, then moving the food products towards an unloading station while dispensing from above the conveyor and onto the product at least one smooth, flowing curtain of hot oil, and controlling the oil flow so that it flows downwardly, continuously in a curtain of oil covering coating and enveloping the food product on the conveyor sometimes referred to as an "enrobing" process—and then removing the treated food product from the fryer at the unloadig station.

A general object of the invention is to provide an improved breaded products fryer for continuously processing a breaded and battered product that is fragile by applying cooking oil to the product from dispensing stations arranged above the product such that the oil will free fall in a curtain onto the product and cook the product in an enrobing action.

Another object of the invention is to provide an improved breaded products fryer of the type described wherein the volume of cooking oil utilized is substantially less than that in prior art fryers of similar capacity and where in the tendency of oil to degraders correspondingly less than in prior art fryers.

Still another object of the invention is to provide an improved breaded products fryer wherein a continuous product conveyor is arranged in a fryer pan such that the return run of the conveyor continuously sweeps the conveyor bottom moving loose bits of product, crumbs and other fines to a fines removal facility or oil outlet sump on the fryer which may be positioned proximate to the product inlet end of the fryer.

Yet another object of the invention is to provide a fryer of the type described wherein the product conveyor belt is arranged with a return run outside of the fryer pan and with an oil return sump positioned proximate to the product discharge end of the fryer.

Another object of the invention is to provide an improved breaded products fryer of the type described which is equipped with a product hold-down conveyor superimposed upon the principal product conveyor.

Still another object of the invention is to provide a new and improved continuous process for treating products including a breaded and battered food product by gently flowing cooking oil over the product as the product is conveyed through the frying process, whether the product is fully or partially submerged or completely exposed and not submerged in the cooking oil.

Yet another object is to provide an improved process of cooking a breaded and battered food product by supplying a plurality of downwardly flowing curtains of cooking oil flowing upon the food product enrobing it as it moves through the cooking process.

In accordance with the foregoing object, it is a further object to provide for a multi-zone frying process wherein cooking oil is applied to the food products at a plurality of locations along the cooking path at preselected oil temperatures, such temperatures being either uniform or following preselected cooking oil temperature curves to more advantageously cook a wide variety of food products.

Still another object is to provide a process as described above wherein cooking oil turbulence is materially reduced at the moment of hot cooking oil contact with the cold uncooked product thereby reducing the forces tending to remove coatings from the food product and producing a highly improved cooked product yield and a superior product in which the surface coating is not partially or fully lost, which loss would expose the "meat" and render the finished product inferior in the eyes of the consumer.

These and other objects of the invention and advantages from its use will become more apparent from the detailed description which follows, taken in connection with the accompanying drawings.

DESCRIPTION OF THE PREFERRED EMBODIMENT

Figure 1:
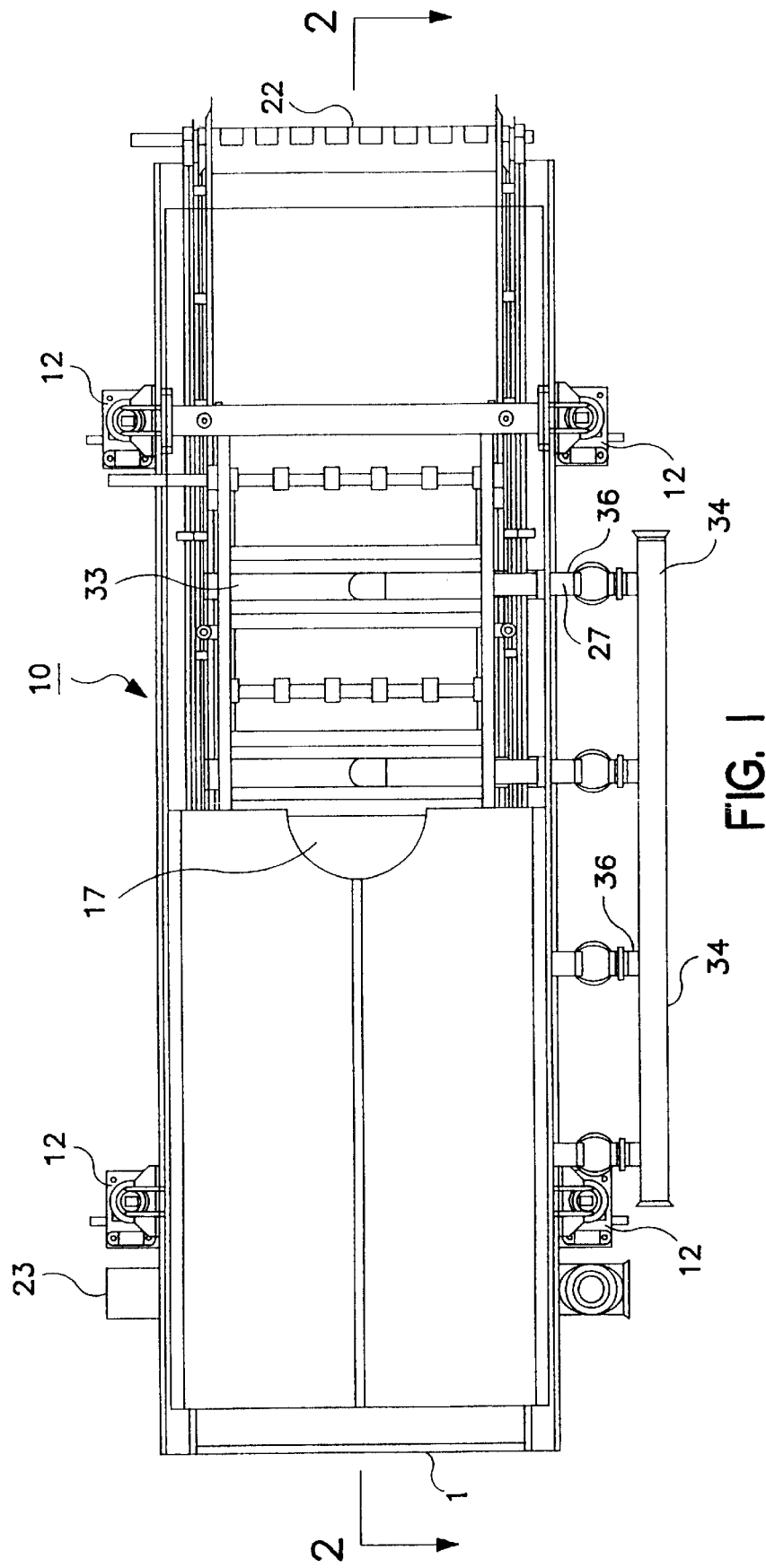
FIG. 1 is a plan view from above of the improved breaded product fryer configured and operating according to the principles of the present invention.
Figure 2:
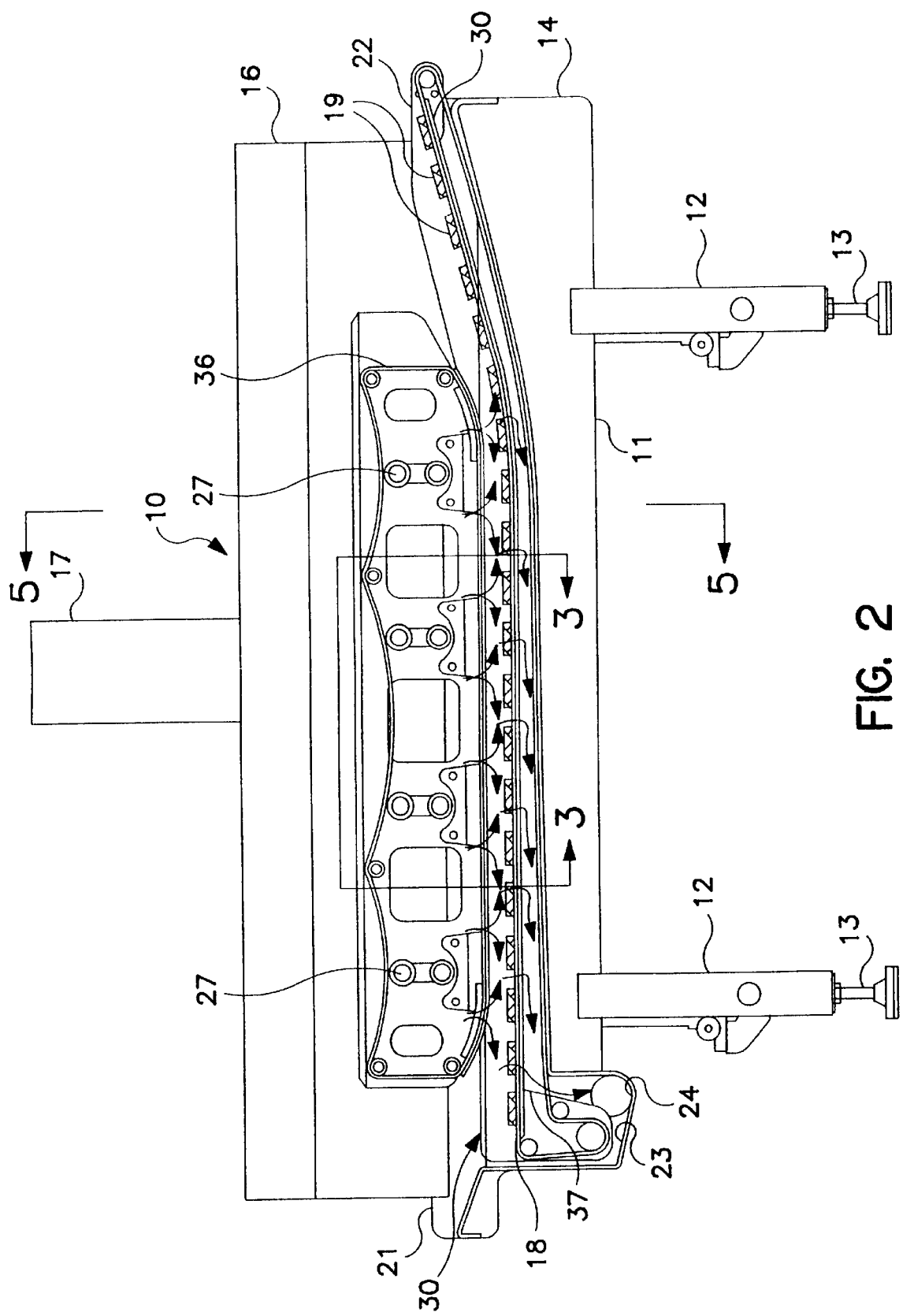
FIG. 2 is a longitudinal sectional view, partially broken away, taken in the direction of the arrows 2—2 in FIG. 1.

An improved breaded products fryer 10 constructed in accordance with and embodying the principles of the present invention is shown in the drawings, referring particularly to FIGS. 1 and 2. The improved fryer 10 includes a frame 11 supported by four upstanding legs 12 provided with level adjustment mechanisms 13 which are operable to enable a uniform, accurate vertical flow pattern of the cooking oil which will be described in more detail below. It is desirable that the frame which supports a pan 14, which retains the cooking oil supply prior to its return for reheating, be maintained level both fore and aft as well as side to side for smooth even flow of the oil curtains.

A hood 16 is mounted on the frame 11 and is equipped with an exhaust stack 17 which serves for the removal of cooking vapors generated beneath the hood 16 and to enable those vapors to be conveyed to a treatment facility (not shown) so as to minimize atmosphere contamination.

A product carrying conveyor 18 is arranged in the pan 14 for moving products 19 deposited thereon from an inlet 21 to an outlet 22. The product conveyor 18 is configured with an inside return so that the conveyor belt, which may be of woven wire mesh or other suitable material affording oil pervious construction, returns along the bottom of the pan 14 moving from right to left, as viewed in FIG. 2, so as to sweep any product fines or residue into the sump 23 for removal therefrom through the conduit 24. Desirably, the width of the conveyor 18 is such that it extends substantially the full width of the fryer so that the return run will sweep the pan bottom completely of product fines. It will be understood that the product carrying conveyor 18 receives products transferred thereto through the fryer inlet 21 at the left of FIG. 2 and conveys the product towards the fryer outlet 22. The outlet end of the conveyor is inclined upwardly so as to raise the treated food products 19 out of contact with the cooking oil and thence for subsequent removal from the fryer 10. The top or product carrying run of the conveyor 18 may operate either above or below the oil liquid level maintained in the pan 14. The selection and control of the cooking oil depth in the pan 14 with respect to the food products on the conveyor top run is determined by the product cooking specifications and more specifically whether it is desirable to have the lower portions of the product conveyed through the cooking oil or to be moved above the cooking oil liquid level. The product conveyor 18 is driven through a variable speed motor drive 23 (FIG. 1) which affords an accurate rate of progression for treatment of the products 19 moving through the fryer 10.

Typical products 19 which are treated in the fryer 10 include, for example, onion rings as well as other vegetables; meats such as chicken and beef as well as fish. These food products may be first dipped in a viscous batter and then covered with a layer of bread crumbs or similar coating which adheres to the batter, thus increasing the weight of the product. Unless handled carefully in the cooking operation, a portion of the breading or other coating will not adhere to the product and will fall into the cooking oil which is undesirable as discussed above. Described below are steps which materially reduce the amount of bread and batter material stripped from the product through the cooking operation.

Certain products tend to move, tumble or shift as they are carried on the conveyor 18 or to "float" in cooking oil residing in the pan 14. For these reasons it is desirable to arrange a holdown conveyor system 26 under the hood such that the lower run of the hold-down conveyor is positioned to engage the upper surfaces of the product 19 and maintain the food product in its initial position on the main conveyor during the cooking process. The vertical position of the hold-down conveyor may be varied to accommodate products 19 of different vertical dimensions. As is the case of the principal product conveyor 18, the conveyor belt of the hold-down conveyor 26 is of wire mesh construction to permit the easy flow there through of the cooking oil dispensed from the cooking oil distribution stations 27 arranged above the conveyor 18 carrying the products 19, as clearly shown in FIGS. 2 and 3. One desirable oil level 30 is indicated in FIG. 2 as coextensive with the lower run of the conveyor 26. I will be understood that the conveyor 26 may be shifted vertically to either engage or be disengaged from a particular size of product and the oil level 30 may be adjusted to accommodate particular processes and products.

Figure 3:
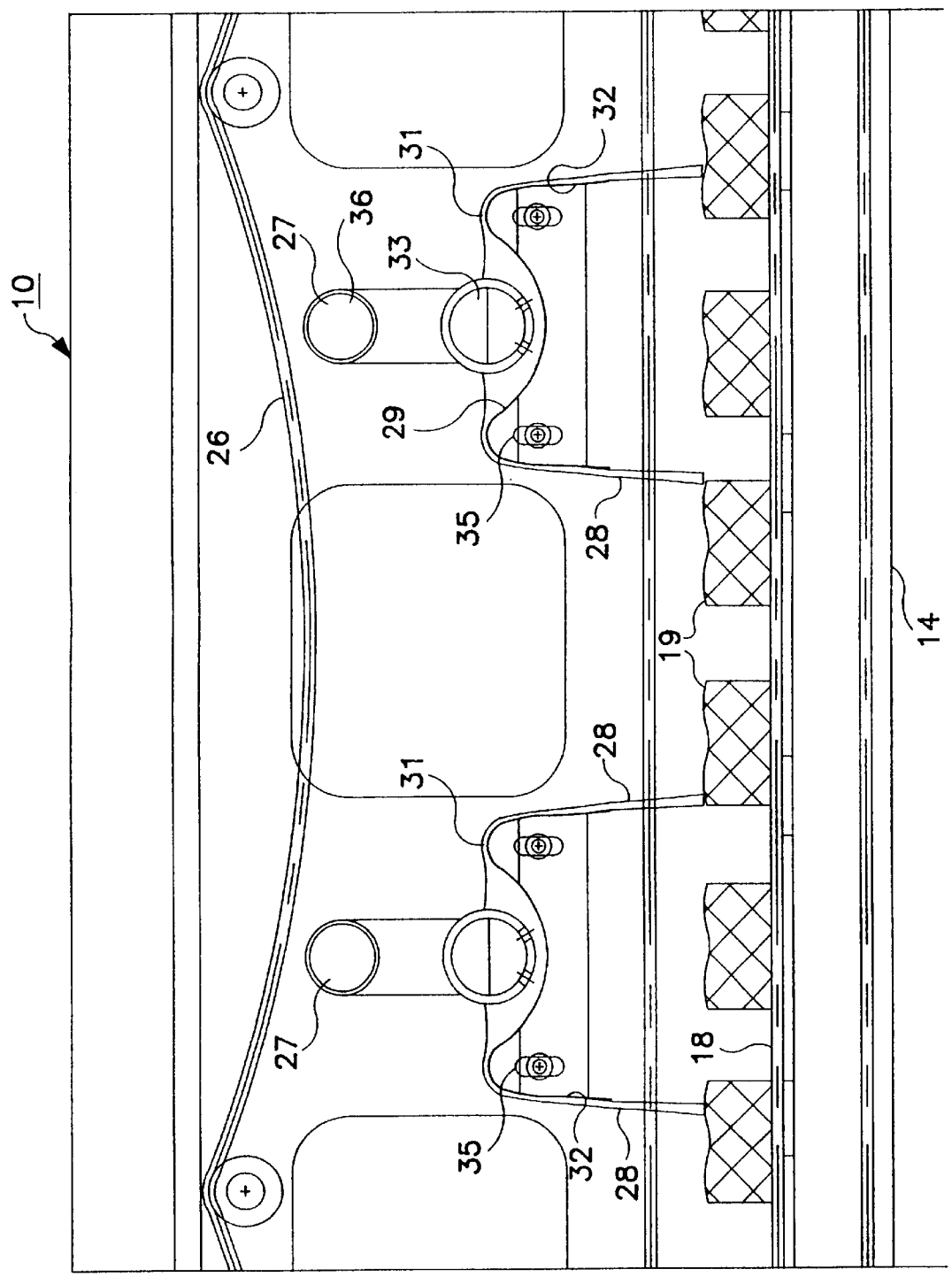
FIG. 3 is a fragmentary, longitudinal sectional view on an enlarged scale taken from the encircled portion in FIG. 2.
Figure 4:
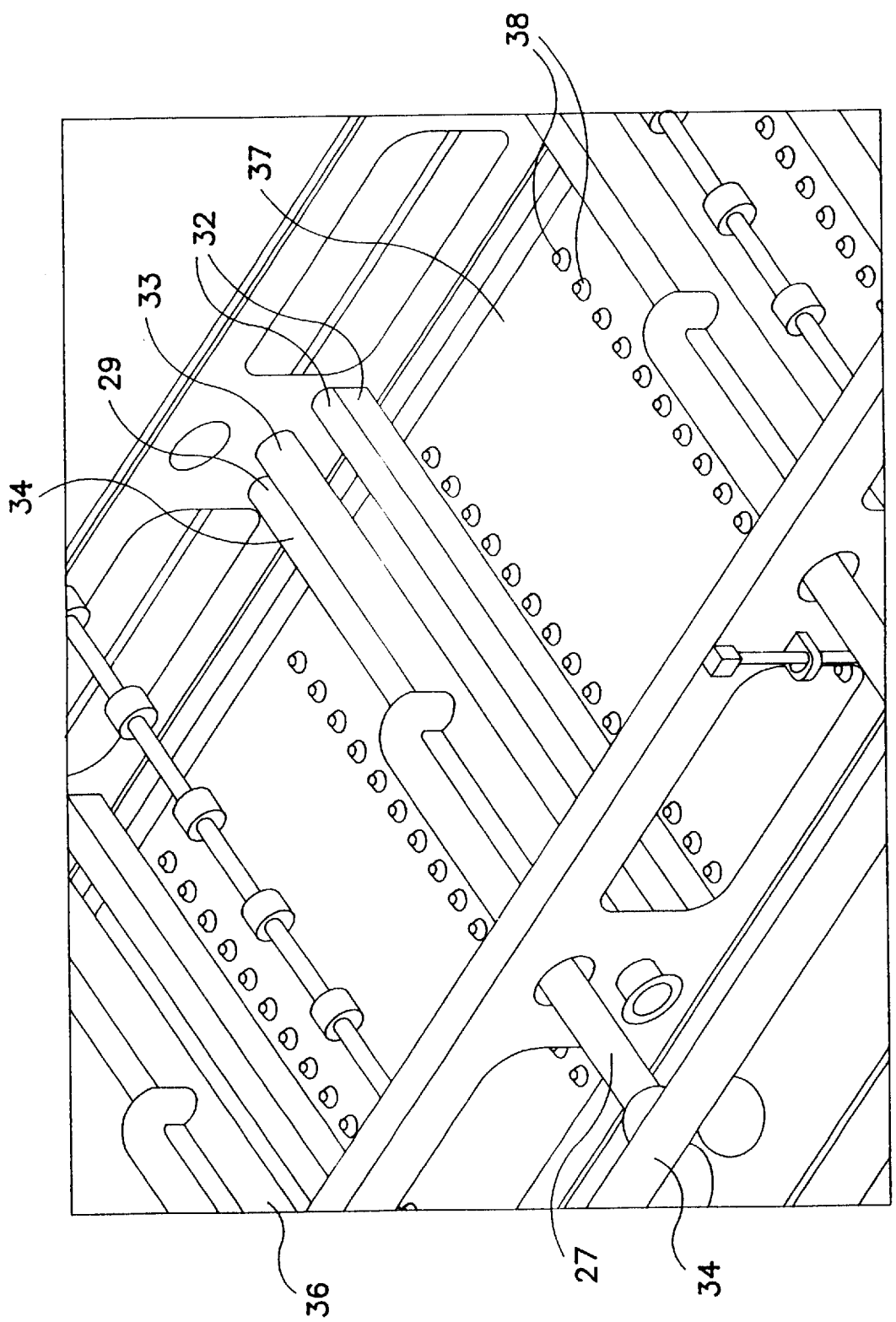
FIG. 4 is a fragmentary perspective view taken from above of the subject matter shown in FIG. 3.
Figure 5:
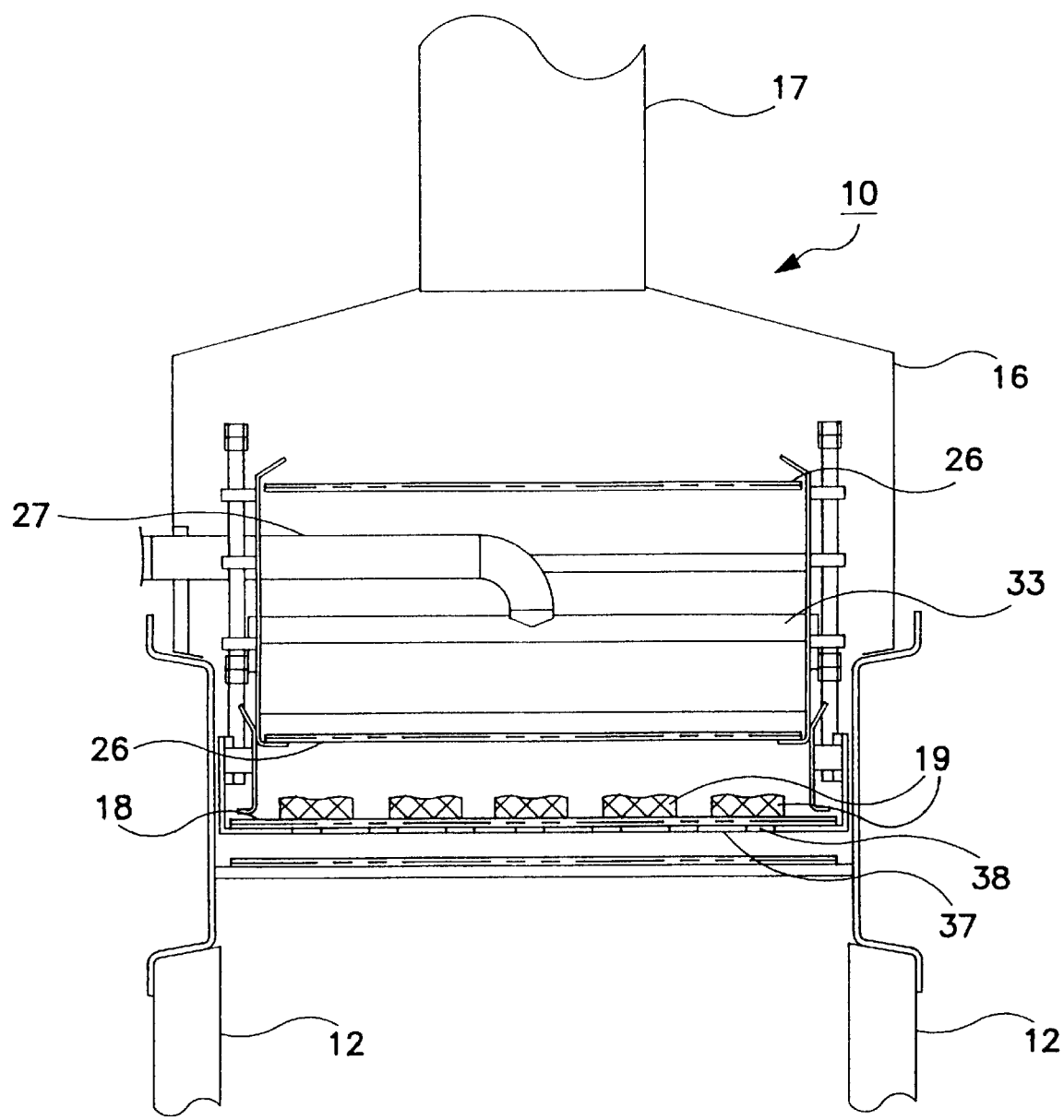
FIG. 5 is a lateral sectional view like taken in the direction of the arrows 5—5 of FIG. 2.

The oil distribution stations 27, best shown in FIGS. 3 and 4, extend-laterally of the conveyor belt 18 and are substantially co-extensive of the width of the conveyor belt so that the full width of the belt may serve as a food cooking area as shown in FIG. 5. The conveyor belt and the distribution stations extend fully with only marginal clearances between the two sides of the fryer as indicated in FIG. 5. The stations 27 serve to distribute or pour hot cooking oil onto the products 19 carried by the belt 18 through at least one and preferably a plurality of curtains 28 of smooth, virtually ripple-free cooking oil. It will be understood that the term "cooking oil" as used herein is intended to embrace oil substitutes such as Olean or Olestra which are trademarks of Proctor and Gamble, Co.

The incoming hot cooking oil flows from a laterally extending, horizontally disposed trough 29 of relatively small volume as compared to that of the pan. The trough 29 is provided with two upwardly rising, smoothly contoured shoulders 31 which merge into descending guide walls or skirts 32. Thus there is established for each distribution station 27 two oil inlet weirs that generate two smooth flowing curtains of cooking oil. Cooking oil is supplied to each trough 29 through a delivery conduit 33 which is provided with oil discharge openings along its bottom perimeter, the openings being positioned below and between the shoulders 31. Incoming oil flows from the conduit 33 to fill the trough 29 from the bottom up to the level of the shoulders from whence the weir action occurs. The spaced apart, horizontally disposed shoulders 31 serve to define or establish the top oil surface in the distribution station. This surface is above the oil discharge openings of the delivery conduit 33. Thus, as incoming oil flows into the rough 29 a corresponding volume of oil flows from the top or overflow oil surface. Thus the cooking oil overflows over the smoothly contoured shoulders 31 and flows downwardly along the guide walls or skirts 32. This creates the weir action and establishes the flow curtains 28 of cooking oil which contact the products in an enrobing action for cooking, e.g., controlled curtain spillage.

The vertical drop of the oil or vertical length of the oil curtains is dictated somewhat by the product height and for this reason the distribution stations include means 35 permitting vertical adjust for raising or lowering and accurate leveling of the stations with respect to the main conveyor belt.

The delivery conduits 33 are supplied from a manifold 34, FIGS. 1 and 4, including the cross supply tubes 36. The manifold 34 is connected to an oil supply from a heat exchanger or the like (not shown) for delivery of oil to the distribution stations 27 at a precise flow rate and temperature.

Once deposited upon and having flowed over the product, the cooking oil then flows through the conveyor belts and through openings 38 in the deadplate or false bottom 37, shown best in FIG. 4. The areas and locations of the openings 38 may be selected to compensate for dynamic pressure differences in the oil flowing under the deadplate 37 so as to minimize any longitudinal oil flow through the product zone above the conveyor 18. The oil flows longitudinally along the pan 14 as indicated by the lower arrows in FIG. 2 in the relatively shallow space between the deadplate 37 and the pan bottom in a flow pattern which is substantially uniform across the full width of the fryer. From one viewpoint, the pan 14 serves merely to contain the cooking oil for recirculation and reheating as contrasted to the prior art fryers where all of the product cooking was conducted under turbulent condition within the oil bath maintained in the pan.

The oil is discharged through the conduit 24 and is circulated to the heat exchanger (not shown) for reheating and return to the fryer at a preselected input initial temperature.

For certain applications, the deadplate 37 may function as a puddler panel as it is arranged along the distribution stations 27 and is disposed underneath the infeed run of the conveyor. The panel is co-extensive with the width of the conveyor belt. The panel functions to collect with the openings in the wire belt a meniscus or puddle of hot cooking oil flowing unto it from the oil curtains above. The oil puddle wets the bottom o the food product to transfer additional heat to the product. This is an efficient arrangement to ensure oil treatment to the lower portions and the bottom of a food product when it is undesirable to fully immerse the lower portions of the product in cooking oil.

Operation and Process Examples

An improved fryer 10 having four oil inlet distribution stations 27 each with two oil overflow weirs 32, 32 and a variable-speed product-carrying conveyor 18, 23 was operated in accordance with the principles of the present invention. A first group of product samples 19 was fried for a range of processing times in the fryer 10, with sufficient oil level to fully submerge all samples. Another group of product samples was fried in the same fryer 10 but with the oil level below the perforated deadplate 37. Sets of control samples were fried either in a conventional breaded products fryer (not shown) or in a still-bath batch fryer, to provide a basis for comparison of cooking times and finished product quality.

EXAMPLE 1

Chicken breasts without any coating were fried at 365° F. for times between 30 seconds and 3 minutes, to compare processing times. There was no measurable difference, as determined by the depth of visible color change, between those samples fried submerged in oil in the improved fryer 10 and those fried for the same lengths of time in the conventional fryer. Samples fried in the fryer 10 but with the oil level below the perforated deadplate 37 required approximately 25% longer total cooking time to show equivalent depths of visible color change.

EXAMPLE 2

Thick potato slices without any coating were fried at 365° F. for times between 30 seconds and 3 minutes, to compare processing times. There was no measurable difference, as determined by the depth of visible opacity change, between those samples fired submerged in oil in the breaded products fryer 10 and those fried for the same lengths of time in the conventional fryer. Samples treated in the fryer 10 but with the oil levels below the perforated deadplate 37 appeared to require approximately 25% longer total cooking time to show equivalent depths of visible opacity change.

EXAMPLE 3

Chicken breasts were battered and flour-coated, then fried at 365° F. in the breaded products fryer 10 with the oil level below the perforated deadplate 37. The product conveyor 18 was advanced manually to simulate a greater range of weir spacing, number of weirs and processing times. Control samples were fried in a batch fryer for 40 seconds at 365° F.

There was no significant coating loss either from the control samples or from any of the trial samples. Total cooking time required to most closely duplicate the control samples varied between 40 seconds at the closest simulated weir spacing and 80 seconds at the maximum simulated weir spacing.

EXAMPLE 4

Chicken breasts were battered and coated with "J" crumbs, then fried in the fryer 10, for 40 seconds at the closest simulated weir spacing, with the oil level below the perforated deadplate 37. Some were fried directly while others were pre-treated by immersion in a still-bath batch fryer for 5 seconds immediately prior to entering the improved breaded products fryer. Control samples were batch fried.

Those samples fried without the pre-treatment showed some coating loss but were otherwise comparable to the control samples. Those samples which were prereated in the batch fryer showed negligible coating loss and most closely resembled the control samples.

These examples demonstrate the versatility of the fryer 10 and the flexibility of the process enabled by it. Other process steps will occur to those skilled in this field and additions and modifications to the apparatus will be envisioned by those skilled art workers.

Second Preferred Embodiment

Figure 6:
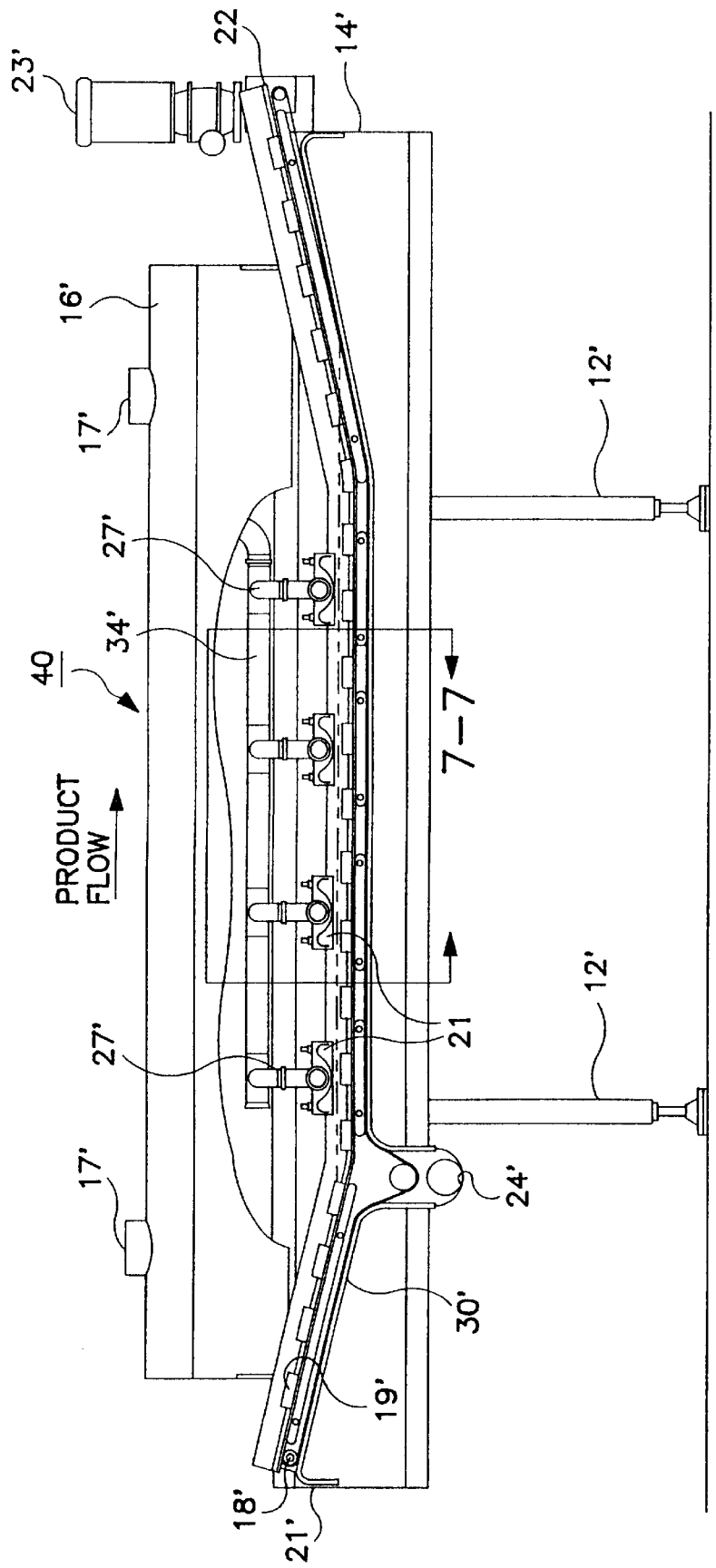
FIG. 6 is a longitudinal section view, partially broken away, showing another preferred embodiment of the present invention.
Figure 7:
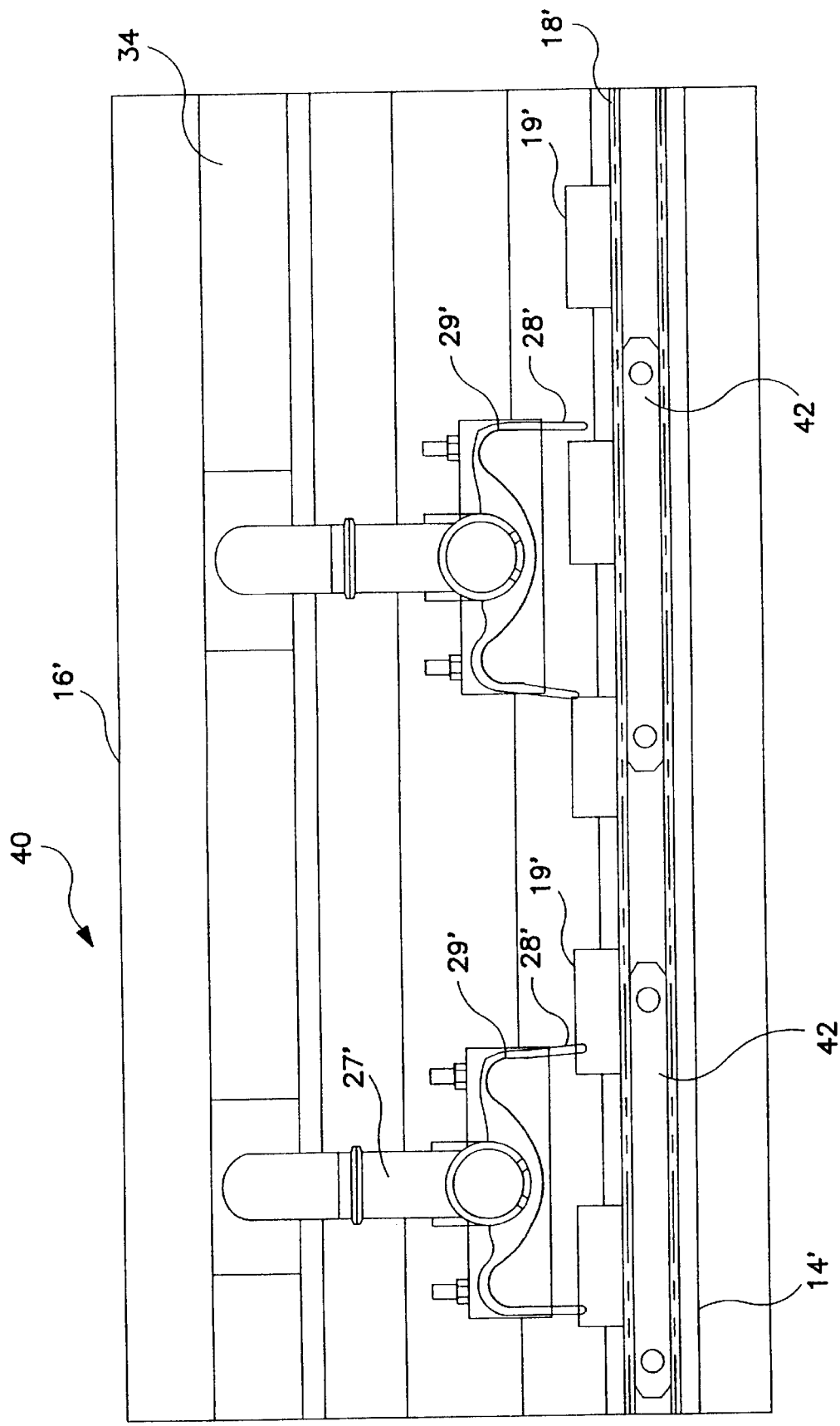
FIG. 7 is a fragmentary sectional view on an enlarged scale taken from the encircled portion of FIG. 6.
Figure 8:
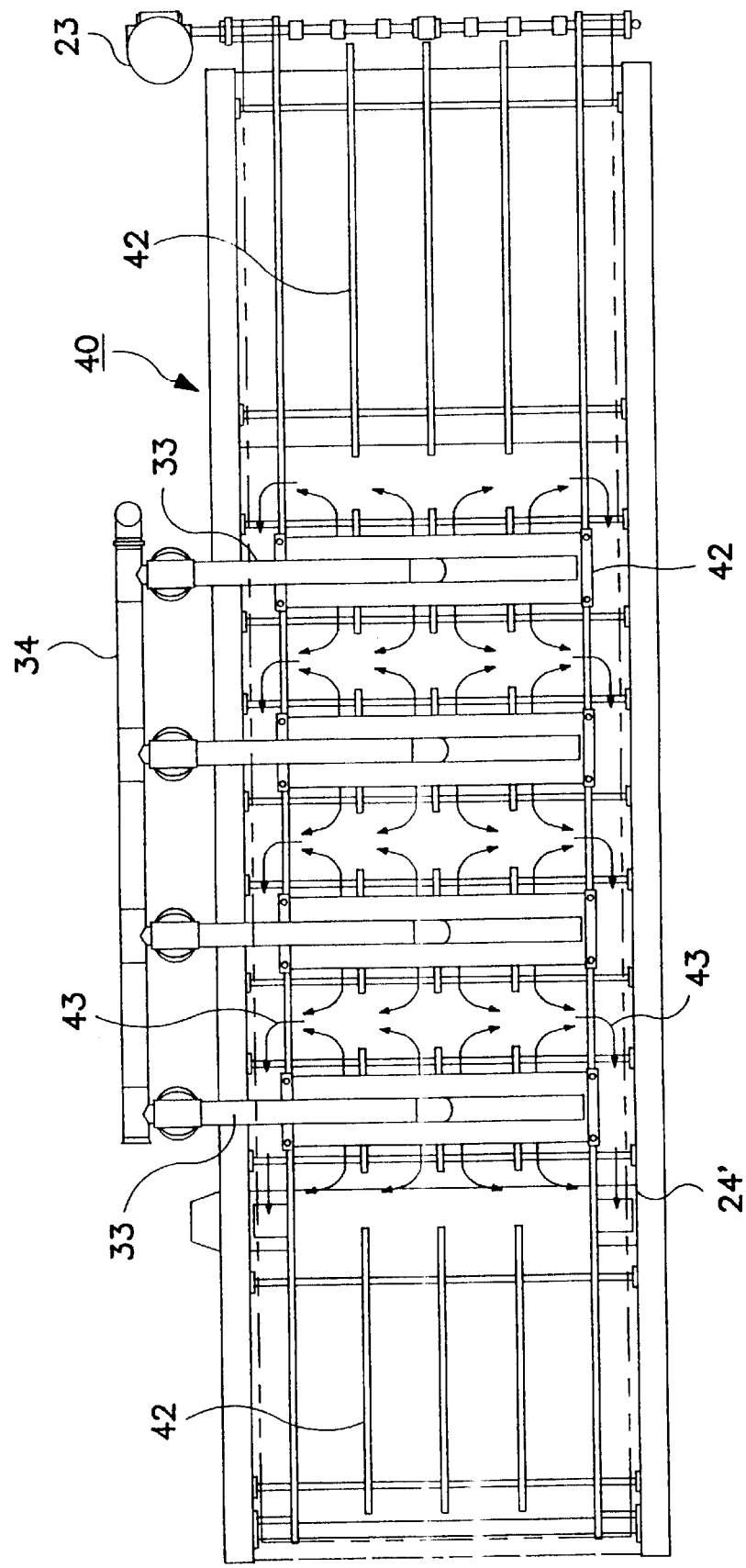
FIG. 8 is a plan view of the breaded product fryer shown in FIG. 6, but with the hood to and conveyor belts removed to clearly illustrate the cooking oil return flow pattern.

A second preferred embodiment of the invention 40 is shown in FIGS. 6–8 and this fryer is constructed in accordance with and embodies the principles of the present invention. Where previously described corresponding parts are indicated in the drawings these are identified with a "prime" (').

The fryer 40 has an inclined inlet section of the conveyor 18' as well as an incline outlet section, as is apparent from FIG. 6. The oil level 30' extends over the top of the product 19' or in other words the products are treated in the fryer in a submerged condition. There is no hold down conveyor present in the embodiment 40 which then is most useful for products 19' which do not tend to float or in which the floating of the product in the oil is within the intended operating parameters.

Referring particularly to FIG. 7, it will be seen that the bottom run of the conveyor 18' is closely spaced with respect to the pan bottom so as in operation to sweep the bottom of the pan 14'. The top run of the conveyor 18 is guided and supported by lane guides 42 which are so positioned with respect to the fryer bottom to define oil return paths as indicated by the arrows 43 in FIG. 8. More specifically, the oil return paths are from the central portion of the fryer to the side and then to urge the oil to migrate toward the sump 24' for removal from the fryer to a reheating unit. Thus the lane guides 42 serve with the conveyor runs to define oil passageways over the fryer bottom for removal of the oil and its recirculation. Five such lane guides 42 are indicated in FIG. 8 although the number may be higher or lower depending upon the width of the fryer and the return flow rate desired.

Third Preferred Embodiment

Figure 9:
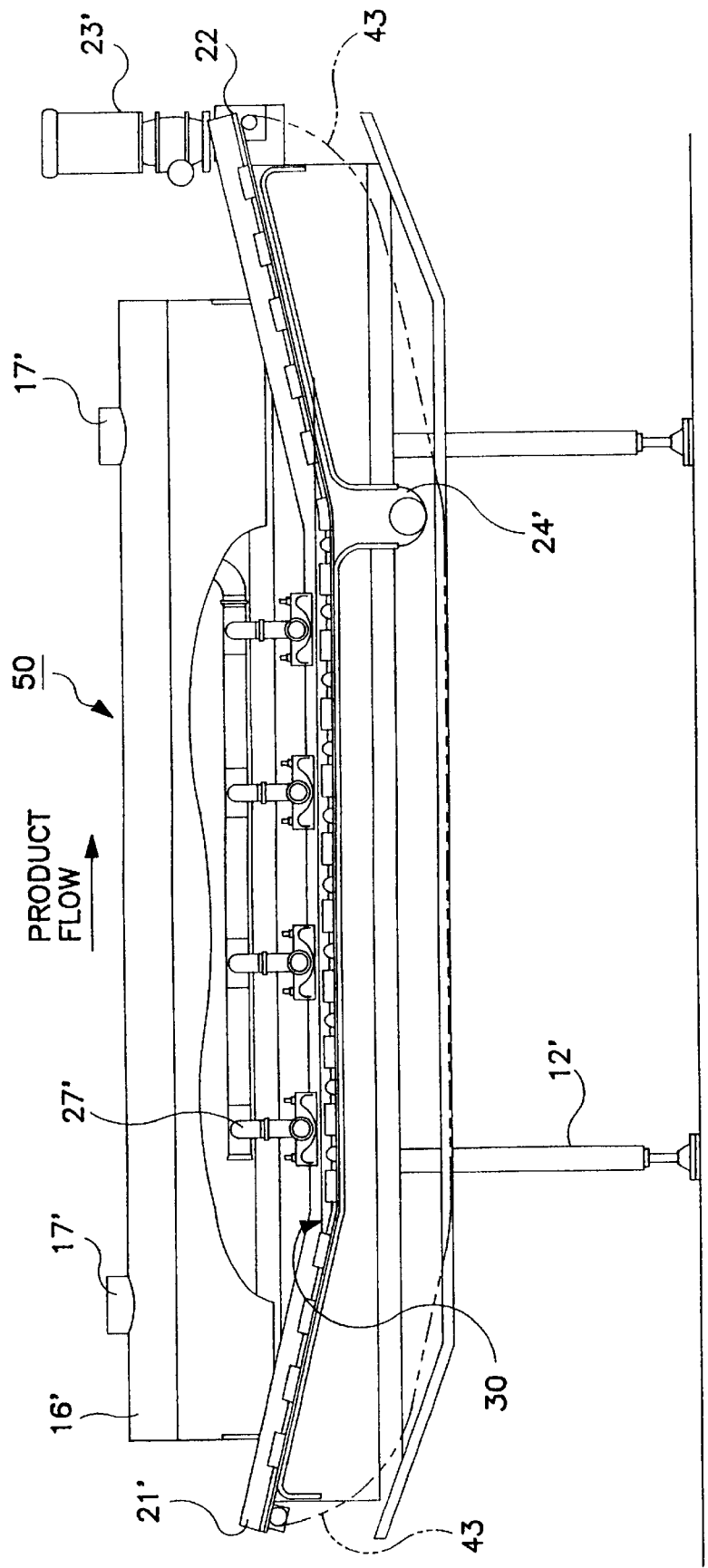
FIG. 9 is an elevation view of still another embodiment of the invention shown with portions broken away and showing a conveyor belt having a return path outside of the fryer pan.

A third preferred embodiment of the invention 50 is shown in FIG. 9 and this fryer is construction in accordance with and embodies the principles of the present invention. Where previously described corresponding parts are indicated in the drawing, these are identified with a "prime" (').

The improved fryer 50 is constructed with parts previously identified and in this instance includes a principal products conveyor 51 which is configured for an outside return. That is to say the return 52 of the conveyor does not travel across the inside of the pan, but returns outside of the pan as indicated in FIG. 9. The top run of the conveyor is arranged to sweep the bottom of the pan and to move any fines that develop in the frying process toward the sump 24' which is positioned adjacent to the discharge end of the fryer.

While there has been disclosed above and illustrated in the drawings what is considered to be the preferred embodiments of the present invention and teach those skilled in the art the principles of the applicants' development, the true scope of the invention shall not be limited except as set out in the claims below.

What is claimed is:

1. A continuous process for treating food products carrying a pre-cooked coating that is fragile and easily dislodged in the cooking operation, comprising the steps of providing a fryer having an endless conveyor including a conveyor belt through which cooking oil can flow, providing a volume of cooking oil for conduction to the fryer, placing the food products with the fragile coating on the conveyor at a loading station for treatment in the fryer and then moving the food products to an unloading station while dispensing from above the conveyor a smooth flowing curtain of hot cooking oil onto the food products carried on the conveyor, controlling the oil flow so that the oil flows downwardly continuously in a curtain of oil for covering and coating the food products on the conveyor, and then removing the treated food products from the fryer at the unloading station.

2. The process of claim 1 further including the steps of providing the endless conveyor with a return run in contact with the fryer bottom, and moving product fines to a fines removal zone through the action of the conveyor return run.

3. The process of claim 1 wherein the cooking oil is removed from the fryer by flowing the oil in spaced apart longitudinal paths in the fryer extending longitudinally of the product conveyor substantially isolated from the food products being conveyed through the fryer.

4. The process of claim 1 wherein the cooking oil is dispensed in a plurality of curtains extending transversely of the path of the product carrying conveyor.

5. The process of claim 4 wherein the cooking oil is provided to the curtains at differing temperatures such that the food products are subjected to varying oil temperatures while being conveyed on the product conveyor.

6. The process of claim 1 wherein the volume of cooking oil in the fryer is maintained at a level below the top run of the product conveyor such that food products carried on the conveyor are not submersed in the cooking oil during treatment.

7. The process of claim 1 wherein the volume of cooking oil in the fryer is maintained at a level above the top run of the product conveyor such that food products carried on the conveyor are at least partially submersed in the cooking oil during treatment.

8. A continuous process for cooking food products by enrobing such products in a flow of hot cooking oil, comprising the steps: providing a fryer including a product loading and unloading station and having an oil receiving pan, and having a conveyor belt of a construction permitting a flow of oil therethrough and operative for traversing the pan between the product loading and unloading stations, providing a volume of hot cooking oil for conduction to the fryer, placing food products on the conveyor belt for movement through the fryer while dispensing from above the conveyor belt in a smooth flow at least one curtain of hot cooking oil to enrobe the food products carried on the conveyor belt, controlling the flow and withdrawal of the oil with respect to the fryer so as to create a puddle of oil in the pan with a liquid level disposed above the conveyor belt serving to insure hot cooking oil treatment of the lower portions and the bottoms of the food products, removing the food products from the fryer at the unloading station and removing the cooking oil from beneath the conveyor belt from the fryer for reheating.

9. The process of claim 8 wherein the food products are selected from the group consisting of chicken parts, vegetables, onion rings, fish and beef pieces.

10. the process of claim 8 wherein the cooking oil is distributed for enrobing the food products from above the conveyer in a smooth flowing curtain so as to flow down continuously,
and providing for a plurality of flowing oil curtains along the conveyer belt.

11. The process of claim 10 wherein flowing oil curtains at different temperatures are provided along the conveyor belt such that the food products are subjected to varying oil temperatures while being conveyed to the unloading station.

12. The process of claim 8 including the step of maintaining in the fryer a volume of cooking oil at a level above the top run of the product conveyer such that the products carried on the conveyer are submersed in the cooking oil.

13. The process of claim 8 further including the step of furnishing to the fryer a volume of oil such that at least at one portion of the oil along the pan is at a level below the top run of the product conveyor such that the food products carried on the conveyor are not submersed in the cooking oil.

14. A process for cooking a food product having a coating that is fragile and easily dislodged in a fryer, comprising the steps of: conveying the food product through a fryer, containing a volume of cooking oil, on an endless conveyor belt, with at least a portion of the food product being outside the volume of cooking oil, and gently pouring a smooth curtain of hot cooking oil onto the portion of the food product which is outside the volume of cooking oil so that the food product is enveloped in the hot cooking oil without dislodging the fragile coating from the food product as it is conveyed through the fryer.

15. The process of claim 14 wherein the curtain of hot cooking oil is poured onto the portion of the food product which is outside the volume of cooking oil by introducing the hot cooking oil into a trough which extends transversely above the conveyor belt and has sloping side walls with smoothly contoured upper shoulders, and allowing the hot cooking oil to overflow the trough across the smoothly contoured shoulders and down the sloping side walls onto the food product.

16. The process of claim 14 wherein the entire food product is outside the volume of cooking oil.

17. The process of claim 14 wherein only an upper portion of the food product is outside the volume of cooking oil.

18. The process of claim 14 including the step of contacting a lower run of the conveyor belt with a surface of the fryer to remove product fines and residue from the belt.

* * * * *